(12) United States Patent
Bernhardt et al.

(10) Patent No.: US 6,688,403 B2
(45) Date of Patent: Feb. 10, 2004

(54) CONTROL SYSTEM FOR A VEHICLE/IMPLEMENT HITCH

(75) Inventors: Gerd Bernhardt, Hanichen (DE); Sergiy Fedotov, Dresden (DE); Ruslan Rudik, Dresden (DE); Heinz Weiss, Bensheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/096,700

(22) Filed: Mar. 13, 2002

(65) Prior Publication Data

US 2002/0134558 A1 Sep. 26, 2002

(30) Foreign Application Priority Data

Mar. 22, 2001 (DE) .......................................... 101 14 091

(51) Int. Cl.[7] .............................................. A01B 41/06
(52) U.S. Cl. .............................. 172/2; 172/439; 701/50
(58) Field of Search ................................ 172/2, 5, 6, 7, 172/8, 9, 439, 442, 444, 446, 447; 701/50

(56) References Cited

U.S. PATENT DOCUMENTS

| 3,432,184 A |   | 3/1969  | Tweedy .................... 280/479 |
|-------------|---|---------|-------------------------------------|
| 4,497,375 A | * | 2/1985  | Mucheyer et al. ............ 172/10 |
| 4,518,044 A | * | 5/1985  | Wiegardt et al. ............. 172/7 |
| 5,012,415 A |   | 4/1991  | Boe et al. .................... 701/50 |
| 5,092,409 A | * | 3/1992  | Defrancq .................... 172/47 |
| 5,240,079 A | * | 8/1993  | Schmidt ...................... 172/6 |
| 5,246,077 A | * | 9/1993  | Tjaden et al. ............... 172/450 |
| 5,255,756 A | * | 10/1993 | Follmer et al. ............. 180/401 |
| 5,697,454 A | * | 12/1997 | Wilcox et al. .............. 172/447 |
| 5,810,095 A | * | 9/1998  | Orbach et al. ................ 172/2 |
| 6,076,612 A | * | 6/2000  | Carr et al. ................... 172/7 |
| 6,119,786 A | * | 9/2000  | Creger et al. ................ 172/7 |
| 6,148,255 A | * | 11/2000 | van der Lely ............... 701/50 |
| 6,196,327 B1| * | 3/2001  | Patel et al. .................. 172/7 |
| 6,196,328 B1| * | 3/2001  | McDaniel et al. ............ 172/7 |
| 6,216,072 B1| * | 4/2001  | Boe et al. ................... 701/50 |
| 6,234,254 B1| * | 5/2001  | Dietz et al. ................. 172/3 |
| 6,250,396 B1| * | 6/2001  | Gengler et al. .............. 172/7 |
| 6,283,222 B2| * | 9/2001  | Gengler et al. .............. 172/2 |
| 6,321,851 B1|   | 11/2001 | Weiss et al. ............... 172/444 |
| 6,487,094 B1| * | 11/2002 | Weng et al. ............. 363/21.12 |

FOREIGN PATENT DOCUMENTS

| DE | 37 39 379 A1  |   | 6/1989  |
|----|---------------|---|---------|
| DE | 40 25 737 A1  |   | 2/1992  |
| DE | 196 20 070 A1 |   | 10/1997 |
| DE | 196 11 626 A1 |   | 11/1997 |
| EP | 0153102       | * | 8/1985  |
| EP | 0280376       | * | 8/1988  |

* cited by examiner

Primary Examiner—Victor Batson

(57) ABSTRACT

A hitch control system controls a hitch for coupling an implement to a utility vehicle. The hitch includes longitudinally adjustable coupling elements operable to shift or pivot the implement in a lateral direction relative to the utility vehicle. A sensor, such as a wheel steering angle sensor, senses a parameter associated with lateral or turning movements of the vehicle. A control unit automatically adjusts the length of the coupling elements as a function of the sensor signals so that the position of the implement relative to the vehicle is adapted to the curved path. This reduces the outer radius of the area over which the vehicle and implement travel when traveling along a curved path and helps avoid collisions with objects.

12 Claims, 5 Drawing Sheets

CONTROL SYSTEM FOR A VEHICLE/IMPLEMENT HITCH

FIELD OF THE INVENTION

The invention relates to a control system for a hitch which couples an implement to a utility vehicle and which can move the implement laterally with respect to the vehicle.

BACKGROUND OF THE INVENTION

When larger implements are hitched to utility vehicles, the position of the implement must be monitored with increased vigilance. Projecting implements can swing out very far, especially when executing a curve. For example, a five-blade plow mounted on a customary three-point hitch can swing out several meters laterally during a turn. This swinging out increases the outer radius of a curved path traveled by the utility vehicle with a hitch. For example, in the case of a typical three-point hitch, the outer radius of the travel path can increase proportionally to the length of the implement. The swinging-out movement must be taken into account by the operator during curve travel in order to avoid a collision with obstacles near to the path. However, it is difficult to monitor the swinging-out of a rear mounted implement, and such collisions cannot always be avoided.

U.S. Pat. No. 3,432,184 describes a hitch device for a tractor with a triangular receiving plate to which the coupling plate of a hitch implement can be fastened. Seven longitudinally adjustable actuators run between the tractor frame and the receiving plate and are articulated by their first end to four articulation points of the tractor frame and by their other end to the receiving plate. If the tractor and the implement are not precisely aligned with one another, one of the actuators can be actuated in order to move the receiving plate laterally and perform the alignment. However, no proposals are made for overcoming the problem cited above.

SUMMARY OF THE INVENTION

An object of the present invention is to provide a hitch control system which reduces problems associated with implement swing-out during curved travel.

A further object is to provide a hitch control system which reduces the outer radius of a curved travel path of an implement coupled to a utility vehicle.

A further object is to provide a hitch control system which reduces the need to monitor an implement during curve travel, which simplified the operators task and which reduces the danger of collisions.

These and other objects are achieved by the present invention wherein a control system controls a hitch which couples an implement to a utility vehicle. The hitch includes longitudinally adjustable coupling element by means of which the implement can be shifted or pivoted in a lateral direction relative to the vehicle. The control system includes a sensor which senses turning operation of vehicle, A control unit automatically adjusts the length of the coupling elements as a function of the sensor signals. The control system automatically tracks the implement in a laterally offset direction relative to the utility vehicle as a function the steering angle, the center of gravity and/or the lateral acceleration of the rig. The implement is pushed and/or swung out laterally relative to the utility vehicle so that the implement is automatically aligned with the turning curve of the utility vehicle during travel. At the same time the overall center of gravity of the rig can be improved.

This control system significantly reduces the outer radius of travel during curve travel, especially in the case of projecting implements, so that the rig can execute smaller turning radii. The job of the operator is eased because the implement swings out less when making a curve and the danger of collisions is reduced.

Preferably, the sensor senses a turning curve value dependent on the turning radius. The coupling elements are adjusted as a function of the turning curve value so that the lateral position of the implement relative to the utility vehicle is adapted to the turning curve. Preferably, the control system takes into account the geometries of the implement and of the utility vehicle. The extent of the shifting or swinging out of the hitched implement required for an optimal radius of travel is calculated from the particular turning curve value.

The sensor preferably comprises a steering angle sensor which detects the deflection of the steering wheel or the deflection of a steered wheel. The control unit determines the particular turning radius of the utility vehicle from the steering angle of the wheels. The control unit calculates the angle of shift or swing of the implement relative to the utility vehicle required to align the implement on the turning curve of the utility vehicle, taking into account the geometry of the utility vehicle and of the implement, so that the turning radius of the entire system consisting of utility vehicle and implement is reduced.

DETAILED DESCRIPTION

Figure 1:
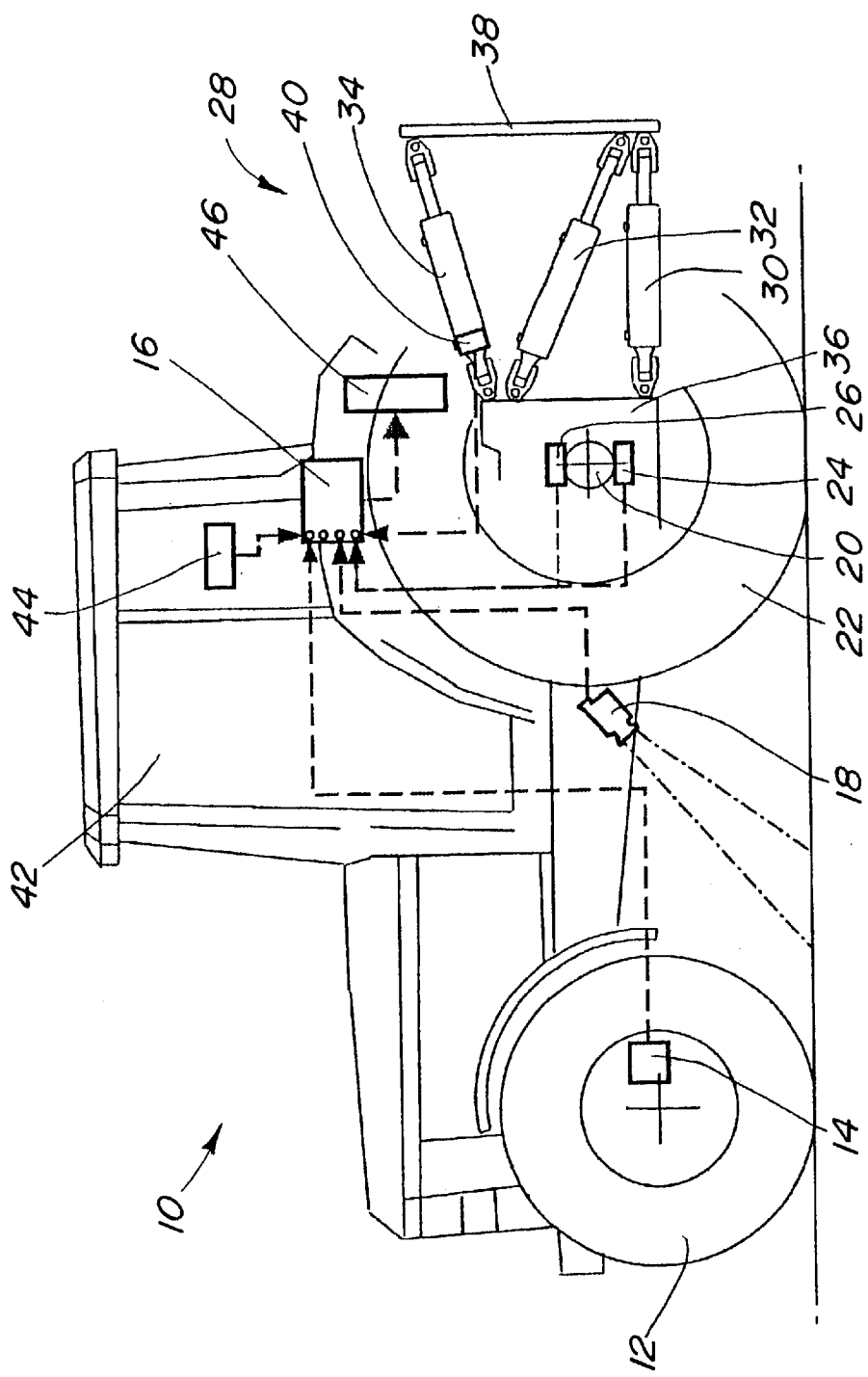
FIG. 1 is a side view of a tractor with a control system according to the present invention.

A typical agricultural tractor 10 shown in FIG. 1. Tractor 10 includes a steering angle sensor 14 which provides signals from which can be determined the turning radius and lateral movement magnitudes of the tractor 10. Sensor is mounted on the steering linkage (not shown) of front wheels 12. Alternatively, or in addition to steering angle sensor 14, an acceleration sensor 15 for detecting the lateral acceleration components of the tractor can also be provided. The electric signals of steering angle sensor 14 or of acceleration sensor 15 are communicated to electric control unit 16.

Figure 2:
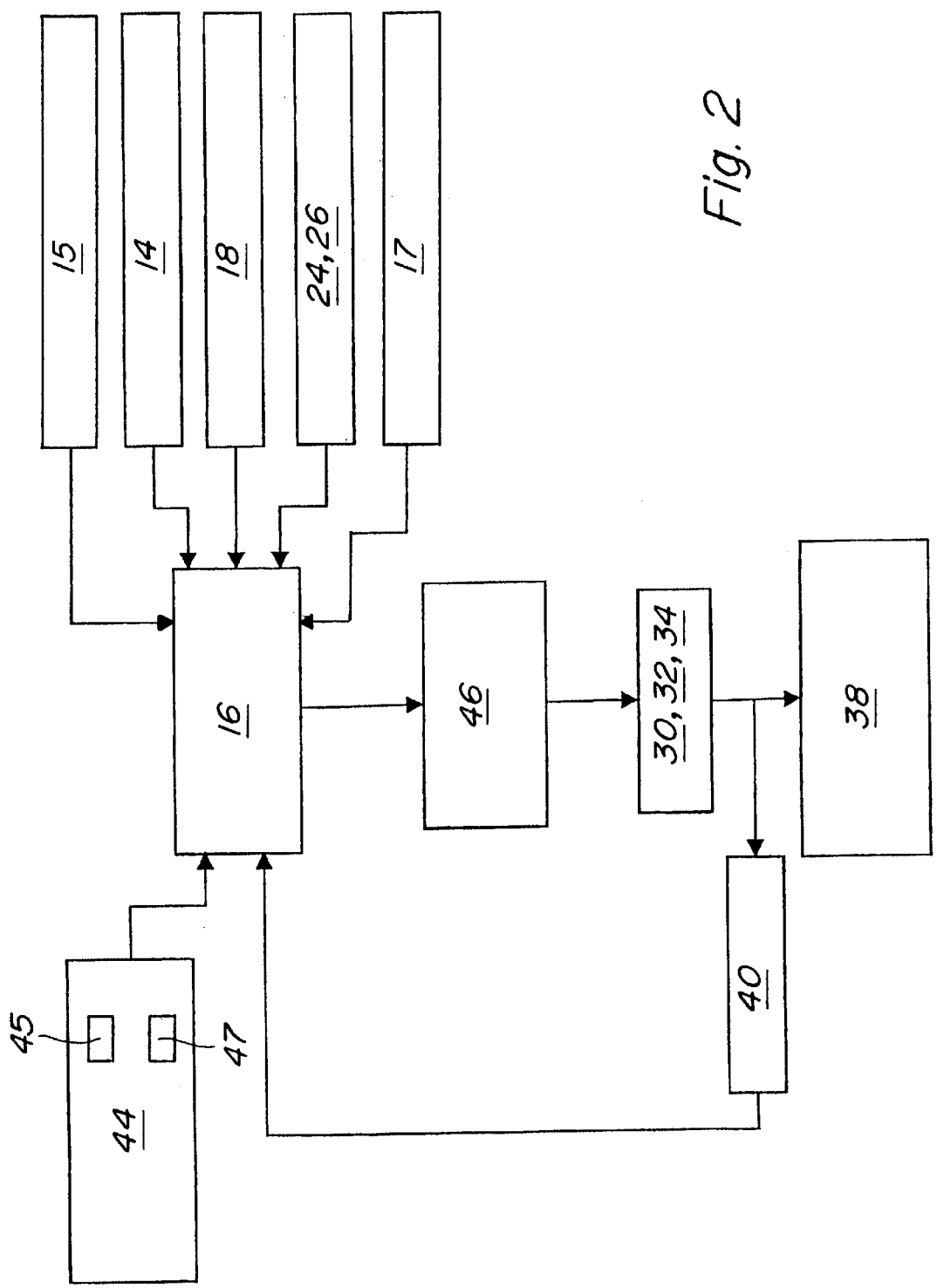
FIG. 2 is a schematic block diagram of a control system according to the invention.

As seen in FIGS. 1 and 2, control unit 16 also receives electric signals from a vehicle speed sensor 18. Preferably, speed sensor 18 is a radar sensor. However, other speed sensors such as, e.g., tachometers arranged in the vehicle drive train can also be used. The control unit 16 adjusts the coupling elements as a function of the travel speed of the utility vehicle. The rate of adjustment of the coupling elements is preferably limited as the travel speed increases. This means that at rather high vehicle speeds the coupling elements are extended and withdrawn more slowly.

In order to assure the stability of the entire system and to avoid safety risks, the lateral position of the implement should be adjusted only at relatively slow travel speeds, such as during travel on a farm. Preferably, when a settable speed limit is exceeded, e.g., 20 km/h, the automatic shifting of the implement is automatically deactivated. If the settable speed limit is exceeded with the implement deflected laterally, the implement is automatically moved back into its base position. This return takes place relatively slowly in order to not initiate any abrupt shifts of the center of gravity.

A sensor system, such as wire strain gauges 24, 26, is arranged on rear axle 20 of tractor 10 and senses the wheel tread forces of rear wheels 22. The strain gauges 24, 26 are adhered to the final drive housing (not shown), and provide electric signals to control unit 16. Preferably, the wheel tread forces of the two rear vehicle wheels are measured. The control unit 16 adjusts the coupling elements and laterally shift or pivots the implement as a function of the distribution of the wheel tread forces to laterally adjust the position of the overall center of gravity of the utility vehicle and the implement.

An implement hitch 28 is mounted at the rear area of tractor 10. Hitch 28 includes six double-acting hydraulic cylinders arranged in a hexapod, as described in U.S. Pat. No. 6,321,851, which is incorporated by reference herein. Three of the six double-acting hydraulic cylinders 30, 32, 34 are visible in FIG. 1, and are pivotally coupled to tractor rear 36 and to coupling frame 38. Implements can be fastened to coupling frame 38. The hydraulic cylinders may be electrically driven correcting elements.

Displacement or position sensors 40 (only one of which is shown), are integrated into hydraulic cylinders 30, 32, 34. Position sensors 40 generate electric signals which represent the extended length of the particular hydraulic cylinder 30, 32, 34 and which are transmitted to control unit 16.

A control module 44 is located in cabin 42 of the tractor 10. Module 44 includes operator controlled switches, such as toggle switches or pushbutton switches, for activating and deactivating the control system of the invention. A first switch 45 is provided for activating or deactivating automatic control of the hitch 28 as a function of the sensed steering angle. A second switch 47 is provided for activating or deactivating automatic control as a function of the vehicle inclination and/or the wheel tread forces of the vehicle wheels. The electric signals are transmitted from module 44 to control unit 16. A lock (not shown) may be provided for safety reasons to permit enabling of automatic implement shifting only when the vehicle is standing still. Alternatively, switches 45 and 47 may be replaced by a single switch (not shown).

Control unit 16 determines theoretical values for the shifting and/or pivoting of the hitched implement relative to tractor 10 as a function of the signals from the sensors. It outputs control signals to proportional valves 46 associated with each hydraulic cylinder 30, 32, 34. Only one of the proportional valves 46 is shown. Flow of hydraulic oil to and from cylinders 30, 32, 34 is controlled by proportional valves 46 in order to extend and withdraw them. Parameters of the tractor and of the hitched implement, such as length, width, track width, wheel interval, index radius of the wheels and center of gravity positions, are used in the calculation of the theoretical value. Control unit 16 can be programmed with these parameters.

The actual value of the lateral shifting of the implement can be determined from the signals from position sensors 40 so that control unit 16 can adjust the theoretical and actual values in order to determine control deviations from which control signals for proportional valves 46 can be calculated.

Referring now to FIG. 2, the control unit comprises a locking circuit (not shown) which permits an activation of the control system only when the tractor is stationary. Whether the tractor is moving can be determined from the signals of speed sensor 18. The operator can activate the control system when the vehicle is standing by actuating the activation switch of operating device 44. Once this has occurred, control unit 16 continuously determines a value for the associated turning radius R (see FIG. 3) from the signals of steering angle sensor 14.

Figure 3:
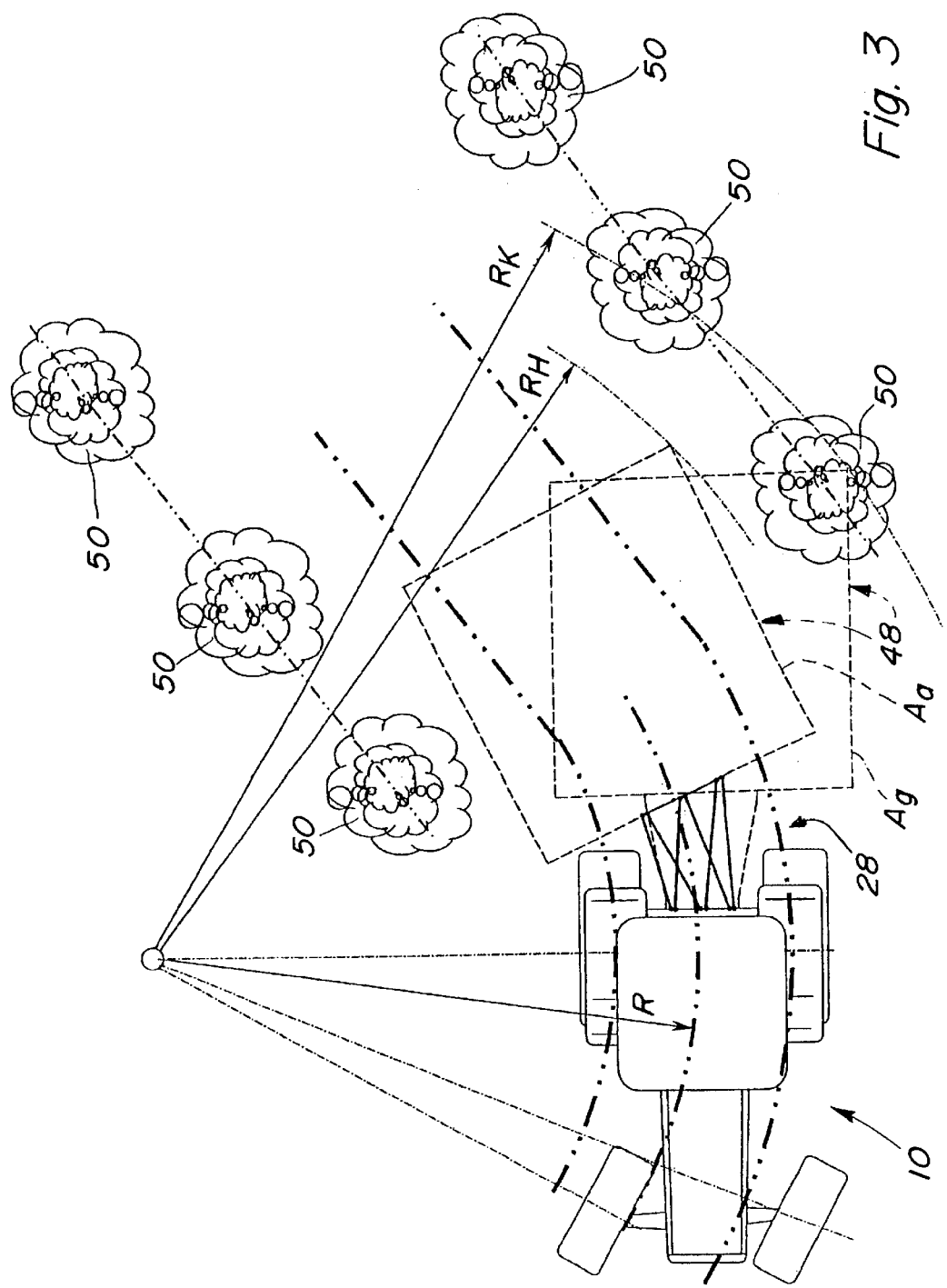
FIG. 3 is a downward view of a tractor with a hitched implement traveling along a curved path.

Referring to FIG. 3, from the value of turning radius R, control unit 16 calculates the lengths of hydraulic cylinders 30, 32, 34 of the hexapod arrangement that are necessary to bring the hitched implement 48 out of its base position, Ag, into a deflected position, Aa wherein the implement 48 is moved to a position relative to tractor 10 which is adapted to turning radius R.

Still referring to FIG. 3, if tractor 10 travels along a curve path with a coupled implement 48 with non-activated control system, the implement 48 remains in the base position Ag relative to tractor 10 wherein the implement 48 remains aligned with the tractor 10. The tractor 10 and implement 48 together require an outer turn radius RK. However, if the control system of this invention is active, the implement 48 will be swung inward by the hitch 28 into position Aa, and the tractor 10 and implement 48 require only a smaller outer turn radius of travel RH, and the control unit 16 controls the hitch 28 and causes the implement 48 to automatically track the tractor 10. In this case, the implement 48 remains approximately in the track of tractor 10, and it does not significantly yaw laterally. This helps avoid collisions with obstacles 50, such as trees. In certain applications it may also be advantageous to shift the implement 48 laterally relative to the tractor or to both shift and pivot the implement 48.

Figure 4:
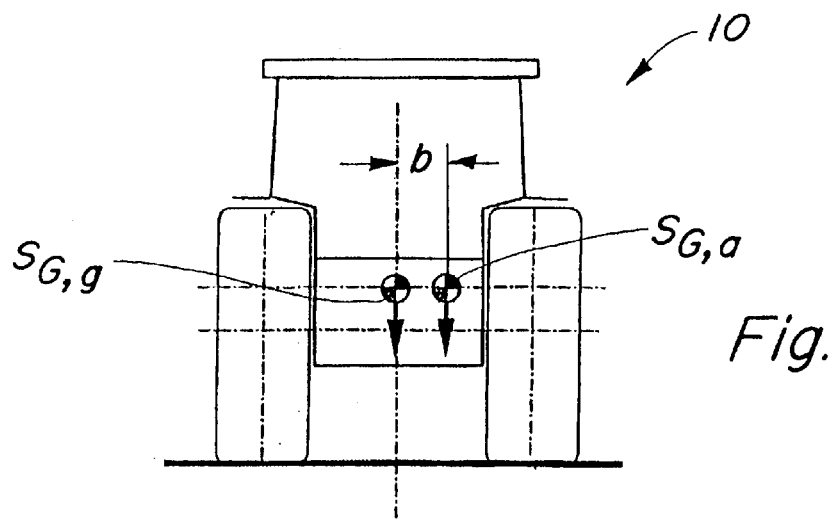
FIG. 4 is a view of a tractor from the rear.
Figure 5:
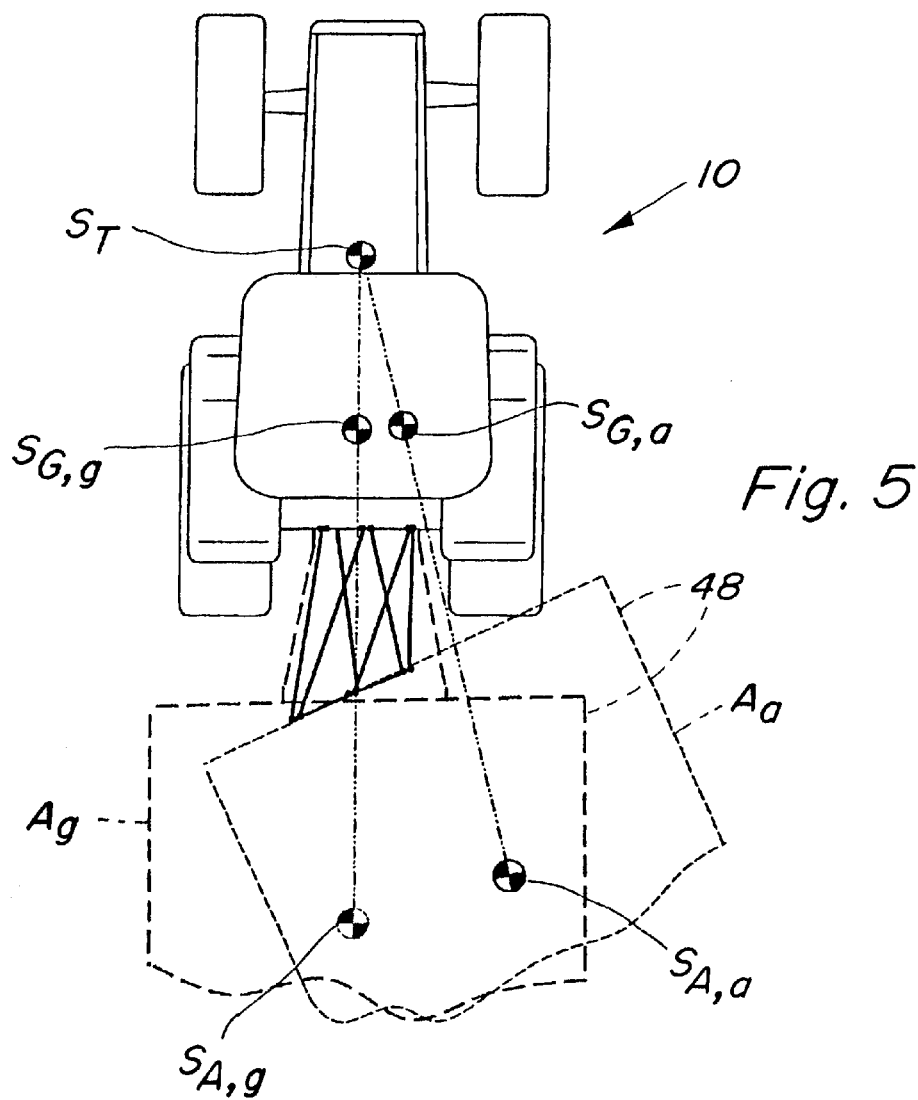
FIG. 5 is a downward view of a tractor hitched to an implement.
Figure 6:
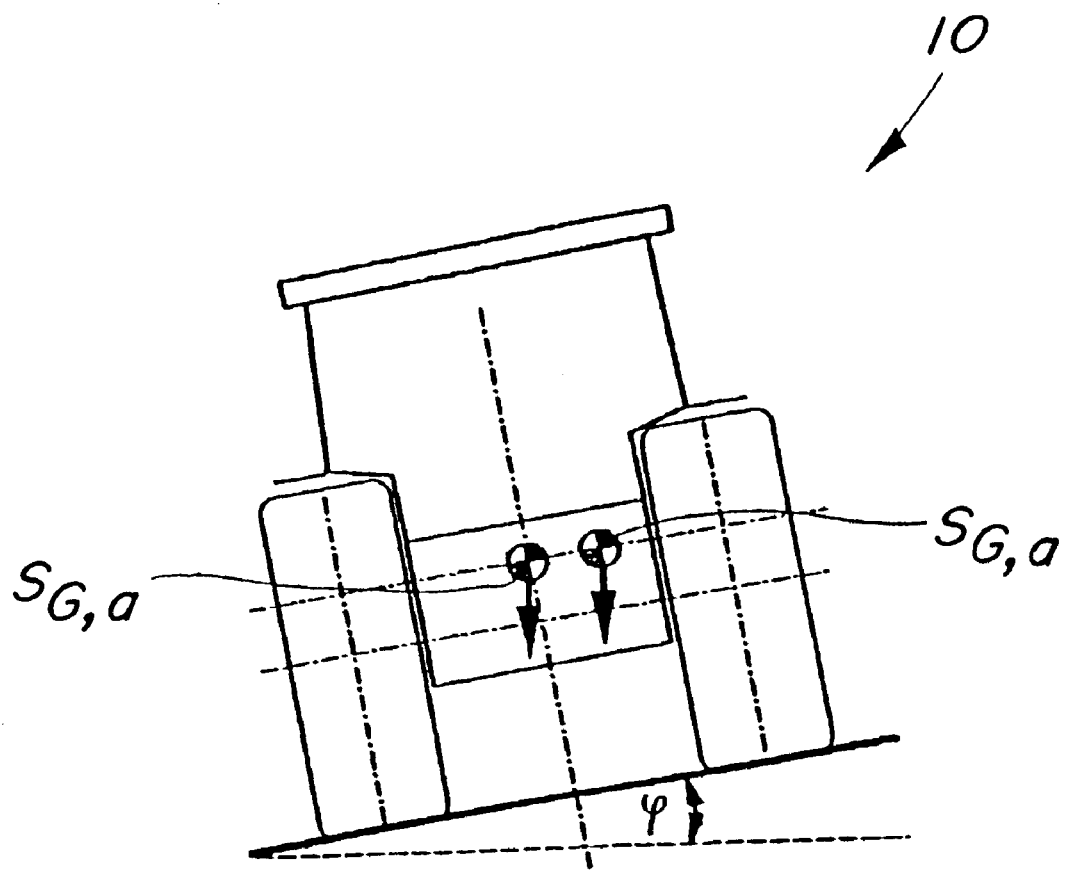
FIG. 6 is a rear view of a tractor on a slope.

During a lateral pivoting or shifting of implement 48 the position of the center of gravity for the entire system, (including both tractor 10 and implement 48) moves out laterally. Referring now to FIGS. 4 and 5, the tractor 10 has a center of gravity ST, the implement has centers of gravity SA,g and SA,a, and the entire system has centers of gravity SG,g and SG,a, wherein subscript g represents the base position and subscript a represents the deflected position. During curve travel the center of gravity of the entire system shifts inward relative to the path curve by an amount b, which has a positive effect on the travel stability.

In order to improve the center of gravity SG of the entire system, control unit 16 calculates the control signals for proportional valves 46 as a function of the sensed values from wire strain gauges 24, 26. If superelevated wheel tread forces prevail on one vehicle side, the implement is swung out or shifted laterally so that a balancing of the wheel tread force of both vehicle sides takes place.

The control system may also include an inclination angle sensor 17 which detects the lateral angle of inclination of tractor 10 when traveling on a slope. Preferably, the control system swings the implement 48 out or shifts it laterally as a function of angle of inclination, in order to shift center of gravity SG of the entire system to the higher side in order to improve stability. Preferably, the overall center of gravity is shifted to the inside of the curve during curve travel. Shifting the center of gravity to the high side of a slope reduces the tipping moment.

Control unit 16 calculates the control signals for the proportional valves as a function of the signals of speed sensor 18 so that, at rather high travel speeds the implement is laterally moved slowly so that travel stability is not adversely affected by a rapid lateral shift of the hitched implement. If the vehicle speed exceeds a settable value, such as 20 km/h, the control unit generates control signals for the proportional valves which cause the implement to be returned into its base position with speed of movement which does not harm the travel stability of the entire system.

This control system can be used in combination with a three-point hitch, if the lower draft links of the three-point hitch are adjustable in a lateral direction.

Alternatively, the actual turning radius may be determined from lateral acceleration of the vehicle sensed by an acceleration sensor. Such sensors suitable for this purpose are sold by the Hotinger Baldwin Messtechnik (HBM) company in Germany. The control may adjust the coupling elements as a function of the sensed lateral acceleration. The turning radius R of the utility vehicle can be determined from the lateral acceleration a and the actual measured speed v of the vehicle according to the formula $R=v^2/a$.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A hitch control system for a hitch for coupling an implement to a utility vehicle, the hitch having a adjustable coupling element operable to move the implement in a lateral direction relative to the vehicle, the control system comprising:

a sensor for sensing a parameter associated with lateral movements of the utility vehicle a speed sensor for sensing travel speed of the vehicle; and a control unit which automatically adjusts a length of the coupling elements as a function of the sensed parameter and as a function of the sensed vehicle speed.

2. The control system of claim 1, wherein:

the control unit limits a speed of lateral relative movement of the implement relative to the vehicle as travel speed increases.

3. The control system of claim 1 wherein:

the control unit deactivates adjustment of the coupling element when a settable speed limit is exceeded.

4. A hitch control system for a hitch for coupling an implement to a utility vehicle, the hitch having a adjustable coupling element operable to move the implement in a lateral direction relative to the vehicle, the control system comprising:

a sensor for sensing a parameter associated with lateral movements of the utility vehicle; and a control unit which automatically adjusts a length of the coupling elements as a function of the sensed parameter to automatically track the vehicle.

5. The control system of claim 4, further comprising:

a first input device for causing the control unit to activate and deactivate automatic tracking as a function of a turning path of the vehicle; and a second input device for causing the control unit to activate and deactivate automatic tracking as a function of vehicle inclination.

6. The control system of claim 4, further comprising:

a first input device for causing the control unit to activate and deactivate automatic tracking as a function of a turning path of the vehicle; and a second input device for causing the control unit to activate and deactivate automatic tracking as a function of sensed wheel tread forces.

7. A hitch control system for a hitch for coupling an implement to a utility vehicle, the hitch having a adjustable coupling element operable to move the implement in a lateral direction relative to the vehicle, the control system comprising:

a sensor for sensing a parameter associated with lateral movements of the utility vehicle;

a wheel tread force sensor for sensing wheel tread forces of the utility vehicle; and a control unit which automatically adjusts a length of the coupling elements as a function of the sensed parameter, the control unit adjusting the coupling elements as a function of the sensed wheel tread forces and laterally adjusting a center of gravity of the utility vehicle and the implement.

8. The control system of claim 7, wherein:

the wheel tread force sensor comprises strain gauges mounted on wheel axles.

9. A hitch control system for a hitch for coupling an implement to a utility vehicle, the hitch having a adjustable coupling element operable to move the implement in a lateral direction relative to the vehicle, the control system comprising:

a sensor for sensing a parameter associated with lateral movements of the utility vehicle; and a control unit which automatically adjusts a length of the coupling elements as a function of the sensed parameter, the sensor sensing a turning curve value dependent on a turning radius of the vehicle, and the control unit adjusting the coupling elements as a function of the turning curve value so that a lateral position of the implement is adapted to the turning radius.

10. A hitch control system for a hitch for coupling an implement to a utility vehicle, the hitch having a adjustable coupling element operable to move the implement in a lateral direction relative to the vehicle, the control system comprising:

a sensor for sensing a parameter associated with lateral movements of the utility vehicle, the sensor comprises a steering angle sensor; and a control unit which automatically adjusts a length of the coupling elements as a function of the sensed parameter.

11. A hitch control system for a hitch for coupling an implement to a utility vehicle, the hitch having a adjustable coupling element operable to move the implement in a lateral direction relative to the vehicle, the control system comprising:

a sensor for sensing a parameter associated with lateral movements of the utility vehicle, the sensor comprising an acceleration sensor for detecting lateral acceleration of the utility vehicle; and a control unit which automatically adjusts a length of the coupling elements as a function of the sensed lateral acceleration of the utility vehicle.

12. A hitch control system for a hitch for coupling an implement to a utility vehicle, the hitch having a adjustable coupling element operable to move the implement in a lateral direction relative to the vehicle, the control system comprising:

a sensor for sensing a parameter associated with lateral movements of the utility vehicle;

an inclination sensor for sensing lateral inclination of the utility vehicle; and a control unit which automatically adjusts a length of the coupling elements as a function of the sensed parameter, the control unit adjusting the coupling elements as a function of sensed inclination.

* * * * *